(12) United States Patent
Feller

(10) Patent No.: US 9,418,782 B1
(45) Date of Patent: Aug. 16, 2016

(54) EFFICIENT POWER SUPPLY FOR AN ELECTROMAGNETIC FLOW METER

(71) Applicant: Onicon, Inc., Clearwater, FL (US)

(72) Inventor: Murray F Feller, Micanopy, FL (US)

(73) Assignee: Onicon, Inc., Largo, FL (US)

( * ) Notice: Subject to any disclaimer, the term of this patent is extended or adjusted under 35 U.S.C. 154(b) by 0 days.

(21) Appl. No.: 14/796,225

(22) Filed: Jul. 10, 2015

(51) Int. Cl.
| | |
|---|---|
| *G01R 31/00* | (2006.01) |
| *H01F 7/06* | (2006.01) |
| *H02J 7/00* | (2006.01) |
| *H02M 3/156* | (2006.01) |
| *G01F 1/58* | (2006.01) |
| *H02J 7/34* | (2006.01) |

(52) U.S. Cl.
CPC ............... *H01F 7/064* (2013.01); *G01F 1/582* (2013.01); *H02J 7/0052* (2013.01); *H02J 7/0063* (2013.01); *H02M 3/156* (2013.01); *H02J 7/345* (2013.01); *H02J 2007/0067* (2013.01)

(58) Field of Classification Search
CPC ......... G01F 1/60; G01F 1/002; G01F 1/8422; G01F 1/8431; G01F 1/8472; G01F 1/849

USPC ................... 324/701, 73.1, 76.11; 73/861.12, 73/861.357
See application file for complete search history.

(56) References Cited

U.S. PATENT DOCUMENTS

| | | | |
|---|---|---|---|
| 3,955,413 A | 5/1976 | Steele | |
| 4,483,201 A | 11/1984 | Haug | |
| 6,453,755 B1 | 9/2002 | Brockhaus | |
| 2002/0000798 A1* | 1/2002 | Schweitzer | ............... G01F 1/60 323/312 |

FOREIGN PATENT DOCUMENTS

DE          3616407 A1     11/1987

* cited by examiner

*Primary Examiner* — Vincent Q Nguyen
(74) *Attorney, Agent, or Firm* — David Kiewit

(57) ABSTRACT

A DC-DC power converter used in an electromagnetic flowmeter supplies a constant current from a capacitive output to an excitation coil during a measurement portion of the operating cycle. During a relatively longer charging portion of the operating cycle the capacitive output is charged from an unregulated supply. When the unregulated supply voltage of the of the DC-DC converter is less than the regulated output voltage repeated high voltage pulses are generated by the excitation coil to charge the output capacitor.

10 Claims, 2 Drawing Sheets

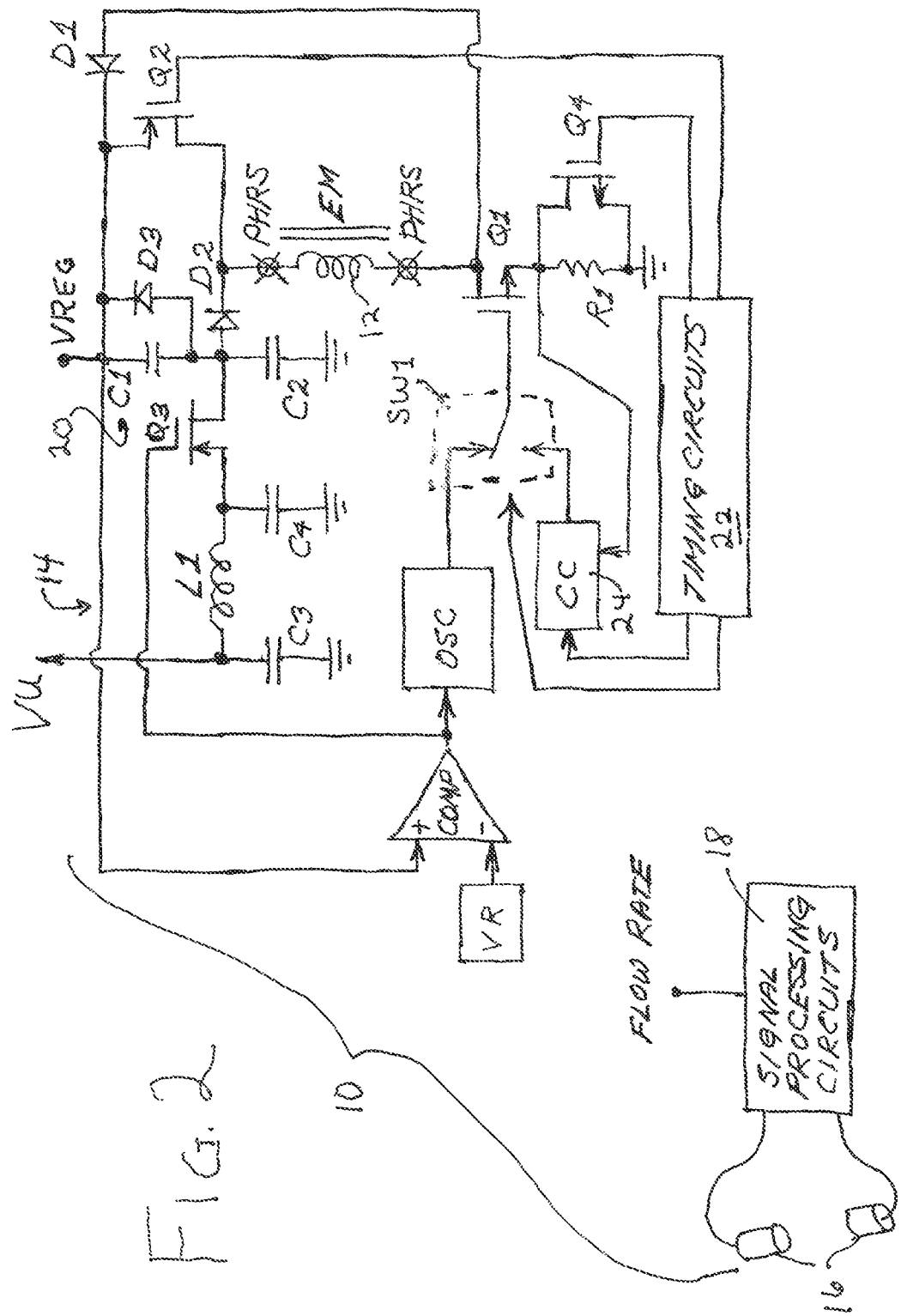

EFFICIENT POWER SUPPLY FOR AN ELECTROMAGNETIC FLOW METER

BACKGROUND OF THE INVENTION

The invention relates to circuits for electromagnetic flowmeters in which a magnetic field applied to a flowing fluid induces a detectable voltage indicative of the flow rate.

BACKGROUND INFORMATION

In many prior art electromagnetic flow meters an electromagnet is powered for a relatively short time during which its induced magnetic field is stabilized at a constant value. A voltage across measurement electrodes then provides an indication of flow rate. Once the measurement is made, the power to the electromagnet is cut off for a relatively long time before the cycle is repeated and another measurement is made. When the power is cut off, the energy in the collapsing magnetic field is typically dissipated as heat and thereby wasted. During portions of the cycle when a measurement is not being made—i.e., most of the time—the electromagnet is unpowered and serves no useful function.

BRIEF SUMMARY OF THE INVENTION

One aspect of the invention is that it provides a DC-DC power converter for powering an excitation coil portion of an electromagnetic flow meter. This power converter is preferably cyclically operable to regulate a DC output voltage during a charging portion of an operating cycle and to supply that regulated voltage to the excitation coil during a measurement portion of the operating cycle.

A particular preferred embodiment of the power converter comprises a selector switch operable under control of timing circuitry to selectively connect, during the measurement portion of the operating cycle, the excitation coil to a constant current source powered by an output capacitor charged to the selected output voltage and to otherwise connect the excitation coil to charging circuitry. The charging circuitry preferably comprises at least one comparator operable to determine if the output voltage is greater or less than an unregulated input voltage; at least one transistor controllable, if the input voltage exceeds the selected output voltage value, to connect the input voltage to the output capacitor until the output voltage attains the selected value; and an oscillator controlled by the at least one comparator to repetitively energize the excitation coil if the input voltage is less than the output voltage, thereby generating, at the output capacitor portion, charging pulses having a voltage greater than the input voltage.

Another aspect of the invention is that it offers a method of providing a selected value of an output voltage from a DC-DC power converter powering an excitation coil portion of an electromagnetic flow meter. This method comprises repetitively carrying out charging and discharging steps. The charging step comprises charging an output capacitor portion of the power converter by comparing the supply voltage with the output voltage and, if the supply voltage is higher than the output voltage, connecting the supply voltage to the output capacitor portion of the power converter until the output voltage attains the selected value. Otherwise an oscillator operates to repetitively drive the excitation coil to generate voltage pulses exceeding the selected output voltage value and to apply those pulses to the output capacitor until the output voltage attains the selected value. The discharging step preferably comprises at least partially discharging the output capacitor through the excitation coil at a constant current.

It is an objective of some embodiments of the invention to recover a portion of the energy in an electromagnetic flow meter's measurement field and to thereby enable that flow meter to operate with lower energy consumption. Furthermore, in these embodiments most of the power used to produce the electromagnetic field is not converted first but used directly, further improving the operating efficiency of the meter.

It is a further objective of some embodiments of the invention to use the inductance property of an electromagnet for power conversion in an arrangement that can compensate for variations in a supply voltage powering the electromagnet portion of an electromagnetic flow meter. This can provide cost and size efficiencies when compared to a conventional approach of using a separate power converter for that function.

Those skilled in the art will recognize that the foregoing broad summary description is not intended to list all of the features and advantages of the invention. Both the underlying ideas and the specific embodiments disclosed in the following Detailed Description may serve as a basis for alternate arrangements for carrying out the purposes of the present invention and such equivalent constructions are within the spirit and scope of the invention in its broadest form. Moreover, different embodiments of the invention may provide various combinations of the recited features and advantages of the invention, and less than all of the recited features and advantages may be provided by some embodiments.

BRIEF DESCRIPTION OF THE SEVERAL VIEWS OF THE DRAWING

FIG. 2 is a schematic block diagram depicting an alternate embodiment of the invention.

DETAILED DESCRIPTION OF A PREFERRED EMBODIMENT

Figure 1:
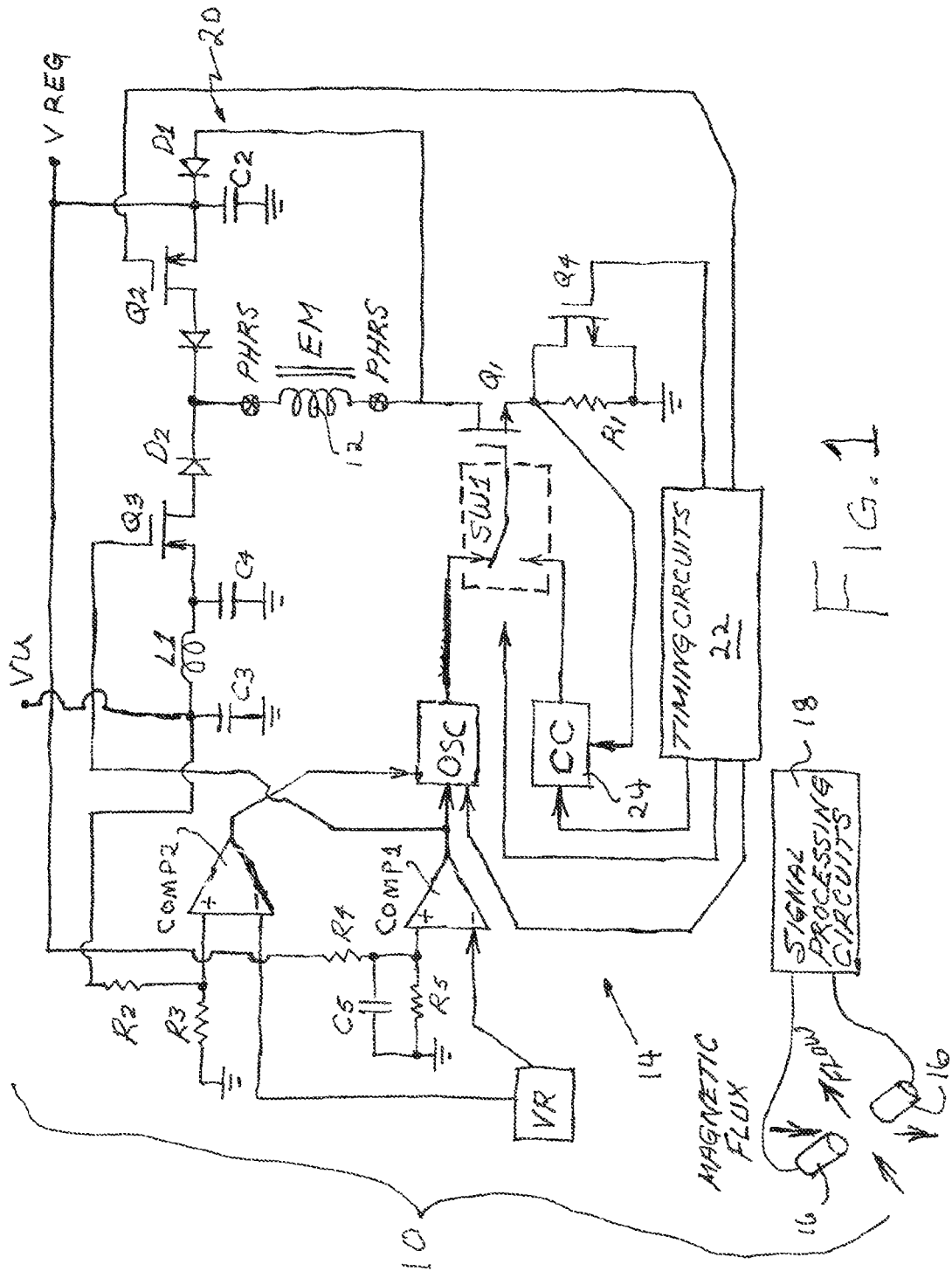
FIG. 1 is a schematic block diagram depicting a preferred embodiment of the invention.

In studying this Detailed Description, the reader may be aided by noting definitions of certain words and phrases used throughout this patent document. Wherever those definitions are provided, those of ordinary skill in the art should understand that in many, if not most, instances such definitions apply both to preceding and following uses of such defined words and phrases.

A preferred electromagnetic flow meter 10 of the invention comprises an electromagnet EM comprising an excitation coil 12; a DC-DC power converter 14 operable from a nominally unregulated unipolar supply VU to supply constant current pulses to the excitation coil 12 during a measurement portion of a duty cycle; at least one pair of electrodes 16 for detecting a flow-dependent voltage during those constant current pulses; and signal processing circuits 18 that receive the detected voltages and determine the flow rate therefrom. During a longer, charging, portion of the operating cycle the DC-DC converter takes power from the unipolar supply VU and from collapsing magnetic fields generated by the excitation coil to provide a regulated DC output voltage VREG.

In preferred flow meters the measurement portion of the operating cycle may be on the order of a few milliseconds, and the charging portion may be on the order of a hundred milliseconds.

In the foregoing description the reader should understand that the unregulated unipolar supply VU may provide DC power at any voltage within a specified range extending both above and below the regulated DC output VREG from a power converter of the invention. In exemplar cases, input voltages ranging from sixteen to thirty five VDC are used to generate a regulated output of twenty volts DC. The reader will recognize that these are exemplar voltages and that the invention is not limited to any particular set of voltages. Moreover, it should be noted that the unipolar supply may be rectified from an AC source and may have a substantial ripple voltage.

The reader should also note that the invention places no limits on particular choices of signal processing electronics and electrodes. These features are schematically depicted in the drawing in the interest of improving the presentation and do not depict the actual locations or functional connections of the components.

A significant aspect of some embodiments of the invention is the dual use made of the electromagnet. During the measurement portion of the duty cycle the excitation coil produces an electromagnetic field for flow measurement. During the charging portion of the duty cycle it may also function as an energy storage device in a DC to DC converter. In preferred embodiments, after a measurement is made and the output capacitor portion 20 of the converter has been partially discharged, the converter recharges the capacitor at a conversion frequency of preferably about 2 KHz. This is significantly higher than the measurement rate of one to ten Hertz. Hence, the signal processing electronics can be readily made to have high immunity to the interference effects of the conversion operation.

Turning now to FIG. 1 one finds a schematic block diagram of a preferred DC-DC converter 14 of the invention. The exemplar converter comprises an electronically controllable mode switch SW1, which may be a model TS5A63157 analog switch made by the Texas Instruments Corporation. The switch selects either the charging or measurement function under control of timing circuitry 22.

During the interval when a measurement takes place, typically a few milliseconds, a discharge current control transistor Q1 operates with the constant current circuits CC 24 through the switch SW1 in the measurement position, to enable Q1 and R1 to pass a constant current through the electromagnet EM so that a flow rate measurement can be made. At all other times, SW1 connects the oscillator OSC to the gate of Q1, as shown, for charging the output capacitive portion 20 which, in the depiction of FIG. 1, comprises an energy storage capacitor C2. During charging R1 is preferably shorted by transistor Q4. PHRS are phase reversal switches used to reverse the current flow in the electromagnet as is typically required for the flow sensing function.

In the charging portion of the operating cycle when power is applied to the circuit the input voltage VU is divided by resistors R2 and R3, with the resultant being compared with a reference voltage VR by a comparator COMP2. If the input voltage is relatively low, the output from COMP2 does not affect the operation of the oscillator OSC which drives the transistor Q1 to deliver current pulses through the electromagnet EM which produces a collapsing magnetic field that, through D1, charges up C2. During this charging mode, an input transistor Q3 is conducting continuously to provide a voltage source through a filter comprising C3, L1, C4, and D2 to the electromagnet. The voltage on C2 is divided by R4, R5 and C5, with the resultant being sensed by another comparator COMP1 against the reference voltage VR. When the voltage on C2 is high enough the comparator COMP1 changes state. This disables the oscillator and provides the VREG terminal with the desired regulated voltage.

Up to a specified input voltage level, for example twenty one volts in a converter in which twenty volts is required as a regulated voltage for providing the constant current pulse to the electromagnet, the circuit operates as a 2 KHz power converter between measurement pulses using the electromagnet EM for energy storage and recovering the energy from the collapse of its magnetic field. When the input is above twenty one volts, the oscillator is disabled and the energy from the power input is switched directly to the twenty volt bus where the switching duty cycle is regulated to maintain the twenty volt level. The energy from the collapse of the electromagnet's magnetic field is then also recovered, but this occurs only once per measurement cycle. By disabling the oscillator when the twenty volt bus can be sufficiently powered by the input power source alone, the efficiency of the circuit is significantly increased.

When the 2 KHz power converter is operating, it charges up the output capacitor to the twenty volt level after which it is disabled for the remainder of the time until the measurement pulse occurs or alternatively, its duty cycle is varied to achieve the same charged voltage on C2.

When the input voltage rises a small amount above that of VREG, comparator COMP2 changes state and thereby inhibits the oscillator from operating. Comparator COMP2 controls the input transistor Q3 by enabling it to fully conduct and then disabling it when the voltage on the VREG output reaches the desired value. Comparator COMP2 can incorporate a small amount of hysteresis to enable the transition between the oscillator enable and disable states to change cleanly.

The VREG voltage is a regulated voltage and may be used as a power source for other meter circuits. As such it can be stepped down and/or inverted to provide a negative supply as may be required.

Turning now to FIG. 2, one finds a simplified schematic diagram of an alternate embodiment of a DC-DC converter 14 of the invention. During the measurement portion of the meter cycle a mode selection switch SW1 is switched momentarily to a measurement position incorporating the constant current control CC in conjunction with R1 and Q1. A discharge transistor Q2 is also switched into its conducting state by the timing circuits 22 so that the electromagnet EM can be energized. The meter senses the induced signals at the electrodes 16 which are processed by the signal processing circuit 18 to provide a flow responsive output signal.

When that measurement current pulse has been completed, SW1, Q1 and Q2 return to their former states and the magnetic field collapses. In so doing, it generates a positive voltage at the bottom of the electromagnet EM which forward biases D1 to charge C1. The voltage at the top of C1 is compared by the comparator COMP to a reference voltage VR and, if it is less by a defined amount, the oscillator OSC is enabled to provide pulses to Q1 to periodically switch it at a relatively high frequency and thereby charge C1 until its voltage is raised sufficiently for the comparator to disable the oscillator.

During charging, Q4 shorts out R1 as it is not required for current control during charging. C1 and C2 are then fully charged awaiting the next measurement pulse. D2 forward conducts to provide the power source for the circuit operation. During a high line condition the comparator COMP switches off the oscillator OSC so that the sum of the voltages across C1 and C2 is always within defined safe limits. A protective diode D3 prevents a voltage reversal across C1 which may occur during a high line condition. L1, C3 and C4 provide input power filtering. As with the circuit of FIG. 1, PHRS are phase reversal switches used to reverse the current flow in the electromagnet as is typically required for the flow sensing function.

In the depiction of FIG. 2, the oscillator is always active when Q3 conducts so that the DC-DC conversion using the EM is active over the full range of the VU voltage. The reader may note that a second comparator (not shown) can be added (i.e., as in FIG. 1) and used to disable the oscillator when VU is higher than VREG so that controlling the duty cycle of Q3 can be use alone for the charging process.

In both of the depicted embodiments the electromagnet is in thermal contact with a fluid, the flow of which is being measured—e.g., it may be configured as a probe immersed in the fluid. Thus, heat dissipated by the coil is transferred to the fluid and does not contribute to the heat load generated by other parts of the flow meter's electronics. This enables the electronics package to be smaller and lighter.

The oscillator operating frequency in the preferred power converters is relatively low when compared to conventional power converters that run at 50-500 KHz. This reduces the need for interference suppression in both of the depicted embodiments.

The reader will recognize that although several topologies of the capacitive output portions have been discussed hereinbefore, these are not limiting. Other arrangements, such as replacing a depicted capacitor with a parallel array of capacitors, are embraced within the scope of the invention.

Although the present invention has been described with respect to several preferred embodiments, many modifications and alterations can be made without departing from the invention. Accordingly, it is intended that all such modifications and alterations be considered as being within the spirit and scope of the invention as defined in the attached claims.

The invention claimed is:

1. A method of providing a selected value of an output voltage from an output capacitor portion of a DC-DC power converter powering an excitation coil portion of an electromagnetic flow meter, the method comprising the steps of:
   providing the excitation coil with thermal contact to a flowing fluid;
   providing a unipolar supply voltage less than the selected value of the output voltage;
   operating an oscillator to repetitively drive the excitation coil to generate voltage pulses exceeding the selected value of the output voltage and to transfer heat to the flowing fluid; and
   charging the output capacitor portion by applying the voltage pulses thereto until the output voltage attains the selected value.

2. The method of claim 1 further comprising:
   at least partially discharging the output capacitor portion through the excitation coil; and
   cyclically repeating the charging and discharging steps.

3. A DC-DC power converter having an output selectively powering an excitation coil portion of an electromagnetic flow meter, the power converter comprising:
   selector switch circuitry operable under control of timing circuitry to selectively connect, during a measurement portion of an operating cycle, the excitation coil to an output capacitor portion of the converter, the output capacitor portion charged to a selected output voltage, and to otherwise connect the excitation coil to charging circuitry for a charging portion of the operating cycle, the charging circuitry comprising:
   a comparator operable to determine if the output voltage is greater or less than an unregulated input voltage;
   a first transistor controllable, if the input voltage is equal to or greater than the selected value, to connect the input voltage to the output capacitor portion until the output voltage attains the selected value; and
   an oscillator controlled by the at least one comparator to repetitively energize the excitation coil if the input voltage is less than the output voltage, thereby generating, at the output capacitor portion, charging pulses having a voltage greater than the input voltage;
   whereby the power converter is cyclically operable, during the charging portion of the operating cycle, to regulate a DC voltage at the converter output to have the selected output voltage value and, during the measurement portion of the operating cycle, to supply the excitation current from the converter output to the excitation coil.

4. The power converter of claim 3 further comprising current control circuitry operable to control the excitation current to have a constant value during most of the measurement portion of the operating cycle.

5. The power converter of claim 3 wherein the output capacitor portion comprises a plurality of capacitors.

6. The power converter of claim 3 wherein the selector switch circuitry comprises, in combination: an analog switch operable to connect a gate of a second transistor to an oscillator during the charging portion of the operating cycle and to current control circuitry during the measurement portion of the operating cycle, the second transistor providing a controllable current flow path between a first end of the coil and ground; and a third transistor providing a current flow path between the output capacitor portion and a second end of the coil.

7. A method of providing a selected value of an output voltage from a DC-DC power converter powering an excitation coil portion of an electromagnetic flow meter, the method comprising the steps of:
   providing an unregulated unipolar supply voltage;
   charging an output capacitor portion of the power converter by comparing the supply voltage with the output voltage and, if the supply voltage is higher than the output voltage, connecting the supply voltage to the output capacitor portion of the power converter until the output voltage attains the selected value; and otherwise operating an oscillator to repetitively drive the excitation coil to generate voltage pulses exceeding the selected value and to apply those pulses to the output capacitor until the output voltage attains the selected value;
   at least partially discharging the output capacitor portion through the excitation coil; and
   cyclically repeating the charging and discharging steps.

8. The method of claim 7 wherein the discharging step is carried out at constant current.

9. The method of claim 7 wherein the electromagnetic flow meter comprises signal processing circuitry operating in synchrony with the discharging step.

10. The method of claim 7 wherein when the oscillator drives the excitation coil it transfers heat to a flowing fluid.

* * * * *